United States Patent [19]

Allen et al.

[11] Patent Number: 5,319,190
[45] Date of Patent: Jun. 7, 1994

[54] POCKET LASER COMMUNICATOR AND ILLUMINATOR

[75] Inventors: Michael S. Allen, Albuquerque; Andreas G. Keipert, Kirtland Air Force Base; Mark W. Gaddis, Albuquerque, all of N. Mex.

[73] Assignee: The United States of America as represented by the Secretary of the Air Force, Washington, D.C.

[21] Appl. No.: 29,844

[22] Filed: Mar. 11, 1993

[51] Int. Cl.[5] .............................. H01J 40/14
[52] U.S. Cl. ..................... 250/214 VT; 359/181
[58] Field of Search ........... 250/214 VT, 216; 359/181, 131, 148, 149, 150, 683; 362/167

[56] References Cited

U.S. PATENT DOCUMENTS

| | | |
|---|---|---|
| 4,479,265 | 10/1984 | Muscatell . |
| 4,622,681 | 11/1986 | Snell et al. ............... 375/48 |
| 4,689,827 | 8/1987 | Gurney, Jr. ............... 359/150 |
| 4,709,416 | 11/1987 | Patterson . |
| 4,823,401 | 4/1989 | Gammarino et al. . |
| 4,864,649 | 9/1989 | Tajima et al. . |
| 4,912,526 | 3/1990 | Iwaoka et al. . |
| 4,959,827 | 9/1990 | Grotzinger et al. ............... 370/3 |

Primary Examiner—David C. Nelms
Assistant Examiner—K. Shami
Attorney, Agent, or Firm—Robert L. Nathans

[57] ABSTRACT

A method of providing near simultaneous night vision and communication including directing a narrow voice modulated IR laser beam at a distant receiver/demodulator during communication periods, causing the IR laser beam to diverge substantially during scene viewing periods, other than the data communication periods, for illuminating a darkened scene which includes the laser beam receiver, and viewing the darkened scene with an IR viewing device.

20 Claims, 1 Drawing Sheet

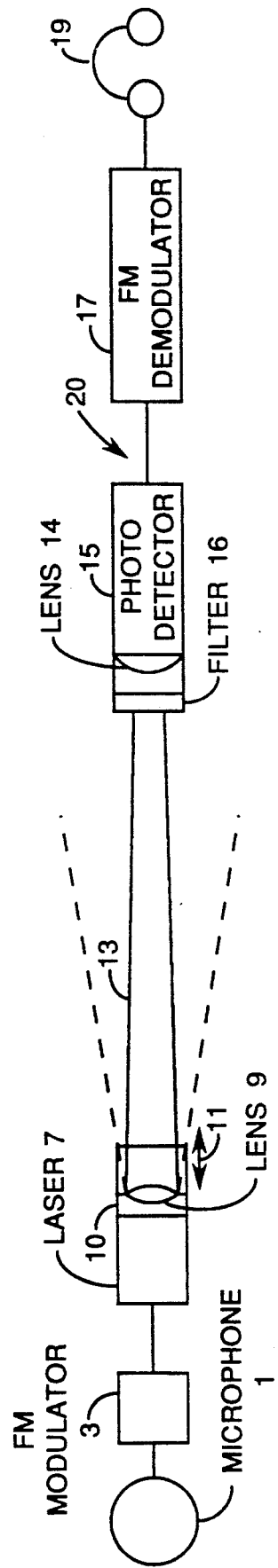

POCKET LASER COMMUNICATOR AND ILLUMINATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of laser communication devices.

The concept of laser communications is fairly mature. It is known to modulate laser beams with various types of data in order to transmit the data over substantial distances. U.S. Pat. No. 4,959,827 to Grotzinger et al. teaches voice modulation of a laser beam for secure voice communication, while U.S. Pat. No. 4,823,401 to Gammarino teaches modulation of a laser beam with binary data to be transmitted to a distant receiver for recovery of the data.

It is deemed desirable to provide devices for secure voice communication over one or two kilometers by modulation of a laser beam. The devices should be compact, light weight and portable in order to minimize adverse impact on the effectiveness of military ground combatants. It is also desirable to provide civilian police with a capability to operate in a dangerous night time mission such as attempting to arrest an armed criminal. Since police departments have limited budgets, cost is an important factor.

It is also deemed desirable to be able to give the police or military combatants the ability to see in the dark in order to determine the location and behavior of an armed person who may be occupying the darkened scene. Since cost is an important factor, what is really needed is the ability to provide secure voice communication along with the ability to see in the dark through the use of essentially the same piece of equipment which is not costly.

BRIEF SUMMARY OF THE INVENTION

The aforesaid goals have been met in accordance with the invention by employing a method of near simultaneous night vision and secure voice communication which causes an IR laser beam to be voice modulated and directed at a receiver for detecting the voice message transmitted over the laser beam during communication periods. By simply translating a lens at the transmitter in a first direction, to produce a widely divergent beam, rather than the pencil beam used during voice transmission, the night time scene becomes illuminated, and the aforesaid dangerous situation is made apparent to the person carrying the transmitter. The beam may almost immediately be narrowed and the beam can be again voice modulated to inform the second person carrying the receiver of the nature of the dangerous situation just viewed by the first person carrying the transmitter. The diverging beam can also be advantageously used for locating the receiver to aid in aiming the narrow laser pencil beam at the receiver.

BRIEF DESCRIPTION OF THE DRAWING

Various other features and advantages of the present invention will become apparent upon study of the following description, taken in conjunction with the drawing in which the sole figure illustrates a preferred embodiment of the invention.

DETAILED DESCRIPTION OF PREFERRED EMBODIMENTS OF THE INVENTION

Referring now to the sole figure, microphone 1 is coupled to a conventional FM modulator 3 which modulates the laser beam 13, produced by laser 7 which may comprise an array of semiconductor laser diodes. Such an array can produce a fairly intense beam. As discussed in col. 2 of U.S. Pat. No. 4,808,789, these laser diodes can offer a conversion efficiency of twenty-five percent or more in some cases. A converging lens 9 is used to direct a narrow pointer beam 13, which could comprise a collimated pencil beam, at the laser beam receiver 20 which employs a photodetector 15 to convert the voice modulated laser beam to an electrical signal which is detected by a conventional FM demodulator/detector 17 to reproduce the electrical audio signal produced by microphone 1 in the 100-to 20 kHz band. The audio signal is in turn forwarded to head-set 19. The details of exemplary conventional FM modulators 3 may be found on pages 440–461 of "Fundamentals of Electronics" by Matthew Mandl; Third Edition; Prentice-Hall Inc. (1973). The details of exemplary FM demodulators 17 may be also found on pages 461–473 of this book.

In a device constructed in accordance with the invention, laser beam 13, produced by laser means 7 within the laser beam illuminator 10, had a wavelength of about 830 nm in the near-infrared. It is preferred that a filter 16 be employed having a narrow bandpass (plus or minus 5 nm) centered around 830 nm. This eliminates substantial undesired background noise. Also Fresnel lens 14 focusses the beam on the photodetector and is placed between the filter and the photodetector 15, which can be one cm x one cm. Advantageously, the Fresnel lens will increase the signal to noise ratio and at the same time, allow larger off-axis operation to aid in aiming the beam upon the photodetector 15. The Frensel lens 14 can receive transmissions at plus or minus forty-five degrees to the normal.

It should now be apparent that during the communication periods, a narrow IR pencil beam 13 is focused upon the photodetector in the laser beam receiver 20. Microphone 1, which can be a bone conduction type fitted in the ear, FM modulates the pencil beam and the FM demodulator-detector in the laser beam receiver 20 recovers the audio. In one device, the FM demodulator operated at thirty kHz with a fourteen kHz bandwidth (plus or minus seven kHz). Unlike RF transmission, the use of a narrow pencil beam provides a far higher degree of security.

During the aforesaid night time viewing periods, in contrast with the communication periods, the beam is made to widely diverge as indicated by beam 22. The entire scene is now illuminated with IR radiation, and the aforesaid potentially dangerous situation such as the presence of an armed person is viewed by providing an IR viewing device such as a pair of night vision goggles or perhaps an IR image convertor for converting an IR scene to a visible scene. Beam divergence is rapidly produced by translating a conventional IR transmissive lens in a first direction. Conversely, translation of lens 9 in a second direction, opposite the first direction, causes the divergent beam to revert back to a pencil beam to provide for almost immediate voice transmission relating to the dangerous situation. Lens translation is schematically indicated by arrow 11. In summary, the communication periods are characterized by use of the pencil beam whereas the viewing periods are characterized by the use of the diverging beam. Of course lens translation may be rapidly produced by rotating a lens barrel containing lens 9 in the conventional manner.

Thus, the operator can adjust the lens on the transmitter to achieve the illumination pattern desired. Communication may be established when the beam is large but the range is limited to eg. 150 feet. on the other hand, narrow beam communication can exceed two kilometers but one kilometer gives optimum results.

The wavelengths can range from 630–670 nm, 800–980 nm, and 1000–5000 nm. For example, if a 980 nm laser is used, the radiation can be seen with the new night vision goggles (GEN III ER). The GEN II and III night vision tubes cannot detect the 980 nm or longer wavelengths as the cutoff wavelengths are about 930–940 nm. The target acquisition function is present since the operator can determine if night vision goggles, scopes and vehicles are present in the field of view by the return of light.

Since other embodiments will occur to those skilled in the art, the scope of the invention is to be defined in accordance with the terms of the following claims and art recognized equivalents.

We claim:

1. A method of providing near simultaneous night vision and communication comprising the steps of:
   (a) providing a portable laser beam illumination device for producing an infra-red (IR) laser beam;
   (b) modulating the IR laser beam with data;
   (c) providing a laser beam receiver, widely separated from the laser beam illumination device, for detecting the IR laser beam received from the illumination device and recovering the data used to modulate the IR laser beam in the portable laser beam illumination device during data communication periods;
   (d) causing the IR laser beam to diverge substantially during scene viewing periods, other than said data communication periods, for illuminating a darkened scene which includes said laser beam receiver; and
   (e) viewing said darkened scene with an IR viewing device.

2. The method of claim 1 wherein step (d) is carried out by translating a lens means with respect to said IR laser beam exiting said portable laser beam illumination device in a first direction to produce a diverging IR laser beam.

3. The method of claim 1 including causing said IR laser beam to become a narrow pencil beam directed upon said laser beam receiver during said data communication periods.

4. The method of claim 2 including translating said lens means in a second direction with respect to said IR laser beam to produce a narrow IR pencil laser beam.

5. The method of claim 1 including the step of causing the IR laser beam entering said laser beam receiver to become focussed upon a photodetector therein.

6. The method of claim 2 including the step of causing the IR laser beam entering said laser beam receiver to become focussed upon a photodetector therein.

7. The method of claim 3 including the step of causing the IR laser beam entering said laser beam receiver to become focussed upon a photodetector therein.

8. The method of claim 4 including the step of causing the IR laser beam entering said laser beam receiver to become focussed upon a photodetector therein.

9. The method of claim 3 including the step of filtering the IR beam entering the laser beam receiver to reduce background noise.

10. The method of claim 5 including the step of filtering the IR beam entering the laser beam receiver to reduce background noise.

11. The method of claim 6 including the step of filtering the IR beam entering the laser beam receiver to reduce background noise.

12. The method of claim 7 including the step of filtering the IR beam entering the laser beam receiver to reduce background noise.

13. The method of claim 8 including the step of filtering the IR beam entering the laser beam receiver to reduce background noise.

14. The method of claim 1 wherein step (b) is carried out by modulating the IR laser beam with an audio microphone generated signal.

15. The method of claim 3 wherein step (b) is carried out by modulating the IR laser beam with an audio microphone generated signal.

16. The method of claim 5 wherein step (b) is carried out by modulating the IR laser beam with an audio microphone generated signal.

17. The method of claim 8 wherein step (b) is carried out by modulating the IR laser beam with an audio microphone generated signal.

18. The method of claim 10 wherein step (b) is carried out by modulating the IR laser beam with an audio microphone generated signal.

19. The method of claim 12 wherein step (b) is carried out by modulating the IR laser beam with an audio microphone generated signal.

20. The method of claim 13 wherein step (b) is carried out by modulating the IR laser beam with an audio microphone generated signal.

* * * * *